US008511455B2

(12) United States Patent
Gonzalez Alemany et al.

(10) Patent No.: US 8,511,455 B2
(45) Date of Patent: Aug. 20, 2013

(54) ESCALATOR STEP

(75) Inventors: Miguel Angel Gonzalez Alemany, Oviedo (ES); Jose Ojeda Arenas, Gijon (ES); Daniel Hernandez Fernandez, Oviedo (ES)

(73) Assignee: Thyssenkrupp Elevator Innovation Center, S.A., Gijon, Asturias (ES)

( * ) Notice: Subject to any disclaimer, the term of this patent is extended or adjusted under 35 U.S.C. 154(b) by 0 days.

(21) Appl. No.: 13/531,040

(22) Filed: Jun. 22, 2012

(65) Prior Publication Data

US 2012/0325617 A1 Dec. 27, 2012

(30) Foreign Application Priority Data

Jun. 24, 2011 (ES) .................................. 201131064

(51) Int. Cl.
*B65G 23/12* (2006.01)

(52) U.S. Cl.
USPC .......................................................... 198/333

(58) Field of Classification Search
USPC .......................................... 198/321, 326, 333
See application file for complete search history.

(56) References Cited

U.S. PATENT DOCUMENTS

| | | | | |
|---|---|---|---|---|
| 2,214,580 | A * | 9/1940 | Dunlop | 198/333 |
| 5,894,917 | A * | 4/1999 | Kwon | 198/333 |
| 5,944,164 | A * | 8/1999 | Behle | 198/333 |
| 5,988,350 | A * | 11/1999 | Nusime et al. | 198/333 |
| 6,543,599 | B2 * | 4/2003 | Jasinetzky | 198/333 |
| 8,220,612 | B2 * | 7/2012 | Matheisl et al. | 198/333 |
| 8,322,508 | B2 * | 12/2012 | Matheisl et al. | 198/333 |

FOREIGN PATENT DOCUMENTS

ES 2 334 630 3/2010

* cited by examiner

*Primary Examiner* — James R Bidwell
(74) *Attorney, Agent, or Firm* — Merchant & Gould P.C.

(57) ABSTRACT

An escalator step has: a first surface (1) in a steppable area having a material with a coefficient of friction between 0.3 and 0.8 for increasing passenger stability. A bearing structure (2) of the first surface (1) supports the first surface (1); housing first connection devices (3) to drive systems (30). The step makes it easier to disassemble the components, reduce operating noise, improve the strength of the step and provide a skirting board that is more rigid against side loads.

15 Claims, 12 Drawing Sheets

ESCALATOR STEP

This application claims benefit of Serial No. 201131064, filed 24 Jun. 2011 in Spain and which application is incorporated herein by reference. To the extent appropriate, a claim of priority is made to the above disclosed application.

FIELD OF THE INVENTION

The present invention relates to an escalator step that improves user safety and reduces the moving masses by using materials suitable in the different parts of the step/pallet. The invention also has the following advantages:

1. It is easier to disassemble the components.
2. It reduces operating noise.
3. It improves the strength of the step.
4. It provides a skirting board that is more rigid against side loads.

BACKGROUND OF THE INVENTION

Walkways and escalators today consist of a continuous band of metal components, such as steps and pallets, attached to one another. The purpose of different drive systems of walkways and escalators is to drive this continuous band of metal components. This band of metal components usually constitutes most of the weight of the system that must be moved by the drive systems. Therefore, one of the problems solved by the invention is that of reducing the weight of the moving components that are driven by the drive systems.

Steps/pallets for escalators/moving walkways formed by a metal rack to which a steppable surface is attached with screws or other attachment means are known. Designs in which the metal rack further constitutes the smooth riser of the step are common; whereas the steppable surface has a grooved surface facilitating the transition between the moving part and the fixed part in the boarding and disembarking areas. In known systems, the steppable grooved surface has been made from wood, aluminum or stainless steel.

Steps formed by a number of parts are also known, where the steppable part and the riser have grooved surfaces, formed by stainless steel or aluminum.

The most common steps/pallets today are built from a cast aluminum part. Steps/pallets built with a plastic material, with metal inserts for achieving the rigidity necessary for the operation of the escalator/moving walkway are also known.

In some configurations, the edges of the steppable surface have yellow markings. Said lines can be replaced with yellow plastic parts with the same marking function.

Some step/pallet designs have attached side steel or aluminum plates, or have inclined edges for the purpose of minimizing the risk of being trapped laterally between the moving steps/pallets and the fixed skirts of escalators/moving walkways.

All these step designs pose a risk of being trapped between steps, especially for certain shoe types, in the areas of transition between the inclined part and the horizontal part of the escalator.

Finally, step designs consisting of an independent steppable surface articulated to a riser are also known, such as those shown in ES 2 334 630, for the purpose of reducing overall dimensions of the escalator and for changing the shape of the riser of from a convex shape to a concave shape.

SUMMARY OF THE INVENTION

An object of the invention is to reduce the weight of the step/pallet, thereby reducing the moving masses and the general size of the components, as well as the associated energy losses.

Another object of the invention is to reduce the risk of being trapped between steps in escalators, for all shoe types, in the transitions between the horizontal movement and inclined plane movement areas.

The step of the present invention comprises two surfaces with different mechanical properties:

a) a first surface in the steppable area having a high coefficient of friction for increasing user stability;
b) a second surface in the area of the riser having a low coefficient of friction for reducing the risk of being trapped between steps in the transitions between the horizontal movement and inclined plane movement areas where there is relative movement between steps.

In a preferred configuration of surfaces for the step, the steppable surface can be manufactured by:

- Molding a composite having suitable mechanical strength and a high coefficient of friction.
- Injecting resin under low pressure on dry fibers (Resin Transfer Molding (RTM) or the like) using resins having a high coefficient of friction.
- Vacuum thermoforming a customized film of a resin having a high coefficient of friction reinforced by carbon fibers or any other material having suitable mechanical strength, arranging the fibers in the directions suitable for optimizing the strength of the part.
- Using a part made from aluminum casting, coated with a coating having a high coefficient of friction.
- Using a rack having suitable mechanical characteristics to which grooved parts having a high coefficient of friction are attached in the area of the steppable surface.

The steppable surface can further have marking elements on its edges and/or attached side plates.

The surface of the riser of the step can be manufactured by:

- Molding a composite having suitable mechanical strength and low coefficient of friction.
- Injecting resin under low pressure on dry fibers (Resin Transfer Molding (RTM) or the like) using resins having a low coefficient of friction.
- Vacuum thermoforming a customized film of a resin having a low coefficient of friction reinforced by carbon fibers or any other material having suitable mechanical strength, arranging the fibers in the directions suitable for optimizing the strength of the part.
- Using a part made from aluminum casting, coated with a coating having a low coefficient of friction.
- Using a sheet of stainless steel for constructing the grooved surface, attached by suitable means to a support rack built with composite having suitable mechanical strength.

Furthermore, the riser can have marking elements on its edges and/or attached side plates.

In a preferred configuration the step can have the steppable surface and the riser articulated to one another.

i) The riser thus articulated has a concave geometry and its position in the escalator is fixed by the links of the drive chain.
ii) A convex riser configuration where the position of the riser in the escalator would be fixed by rollers attached to said riser is also possible.

The step of the present invention can be made as one piece without articulation between the steppable surface and riser. In this case the manufacturing operations must take into account the use of different materials with different friction requirements for each of the two described surfaces, the first surface in the steppable area having a high coefficient of friction and the second surface in the area of the riser having a low coefficient of friction. Therefore, the one-piece step can be manufactured by:

Injecting a two-component plastic using a material having a low coefficient of friction in the riser and having a high coefficient of friction in the steppable surface.

Vacuum thermoforming a customized film of a resin having a low coefficient of friction for the area of the riser; and having a high coefficient of friction in the area of the steppable surface, reinforced by carbon fibers or any other material having suitable mechanical strength, arranged in directions suitable for optimizing the strength of the part.

Aluminum casting using a coating having a low coefficient of friction for the riser of the step and a coating having a high coefficient of friction for the steppable surface.

Using a rack having suitable mechanical characteristics to which grooved parts having a high coefficient of friction are attached in the area of the steppable surface; and having a low coefficient of friction in the area of the riser.

The step thus built can have marking elements on its edges and/or adjacent side plates.

In the preferred configuration, overall weight of the step is reduced by reducing the moving masses and the associated power consumption and the risk of being trapped between steps in the transitions between the horizontal movement and inclined plane movement areas.

Other advantages of the invention are:

1. It is easier to disassemble the components to facilitate repair/maintenance work.

2. It reduces operating noise, among other reasons because it allows manufacturing the skirting board using plastic materials.

3. It improves the strength of the step because supports are optimized.

4. It provides a skirting board that is more rigid against side loads: on one hand, it can incorporate reinforcements for supporting said loads, and on the other hand, part of its components, specifically the second plates, are rigidly attached to the tread or first surface of the step.

BRIEF DESCRIPTION OF THE DRAWINGS

The attached drawings depict a non-limiting embodiment, the description of which will help to better understand the constitution, features and advantages of the step of the invention.

DETAILED DESCRIPTION OF AN EMBODIMENT

Figure 1:
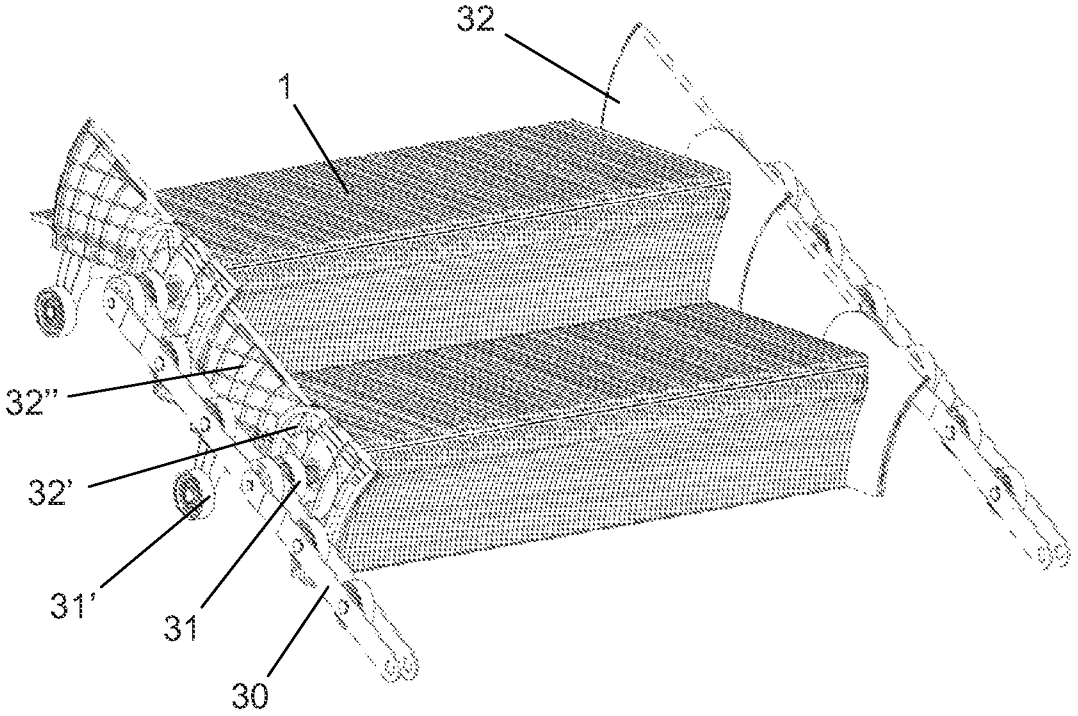
FIG. 1 is a perspective view of a step according to a preferred configuration of the invention with a concave riser.
Figure 2:
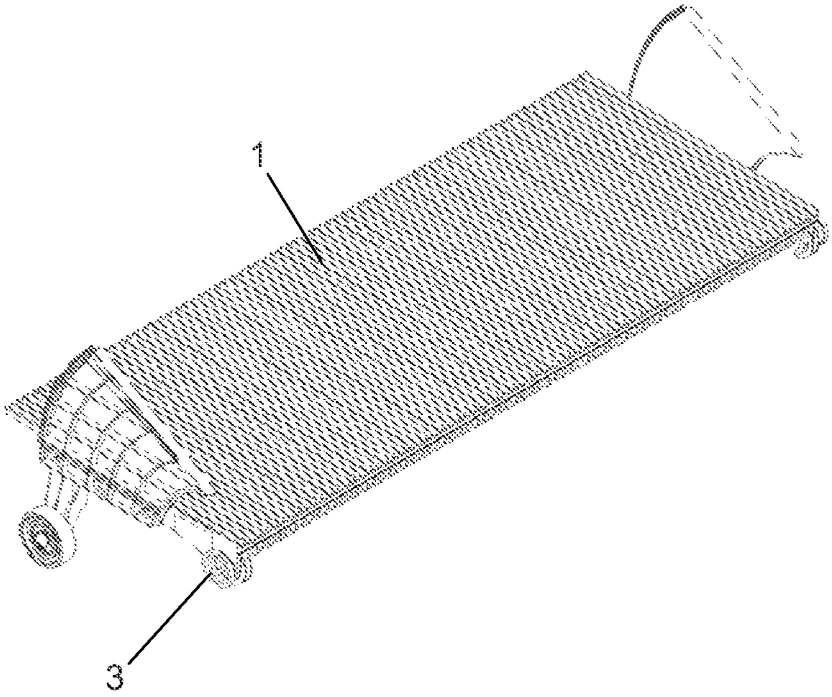
FIG. 2 shows a top perspective view of the steppable platform of FIG. 1, manufactured from injected aluminum.
Figure 2A:
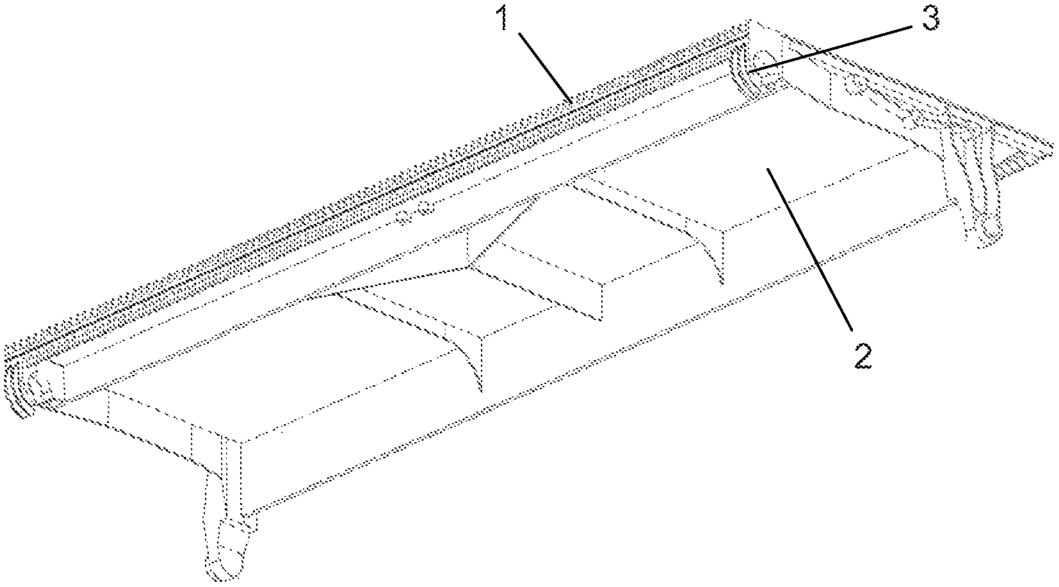
FIG. 2A shows a bottom perspective view of the steppable platform of FIG. 1, manufactured from injected aluminum.
Figure 3:
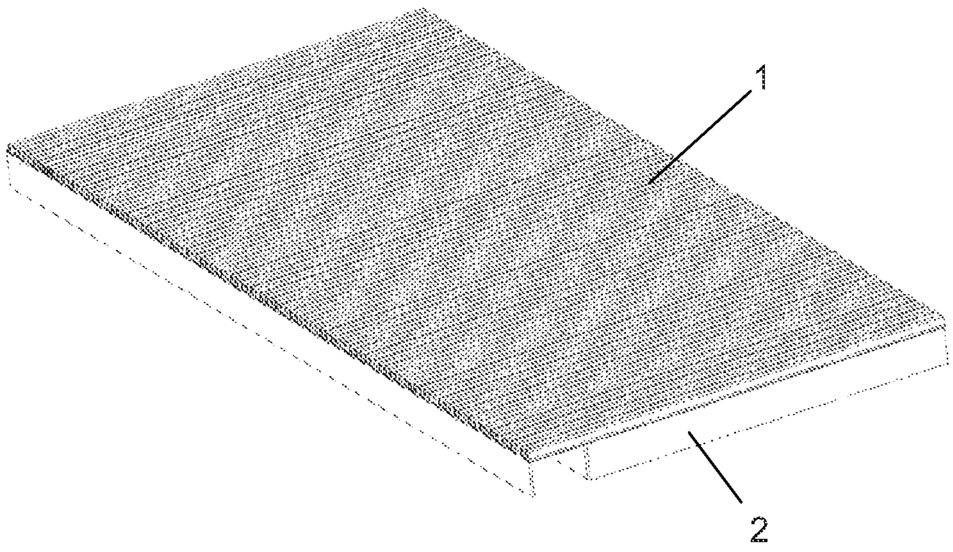
FIG. 3 shows a perspective view of a steppable platform of FIG. 1.
Figure 3A:
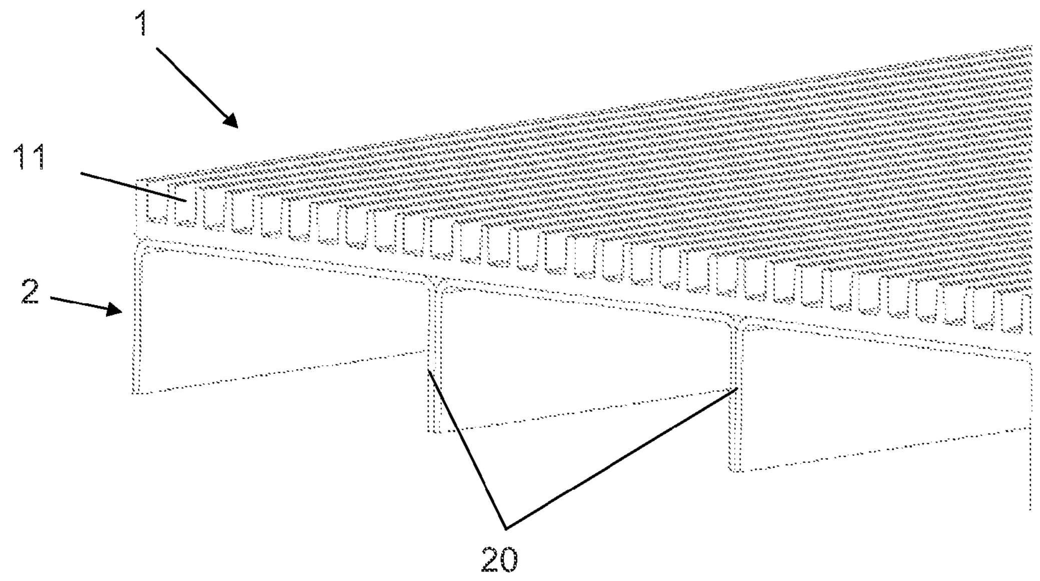
FIG. 3A is a detail of FIG. 3, where the steppable platform is manufactured from a composite having a high coefficient of friction.
Figure 3B:
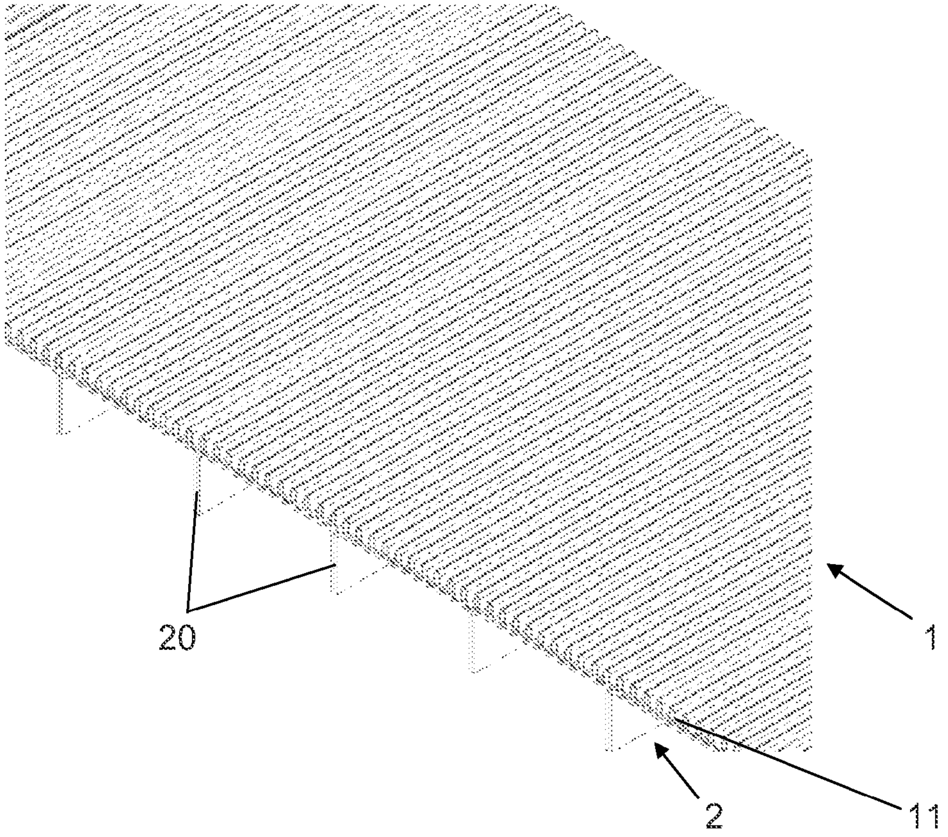
FIG. 3B is a detail of FIG. 3, where the steppable platform is thermoformed from a customized film of resin having a high coefficient of friction, reinforced with carbon fibers.
Figure 3C:
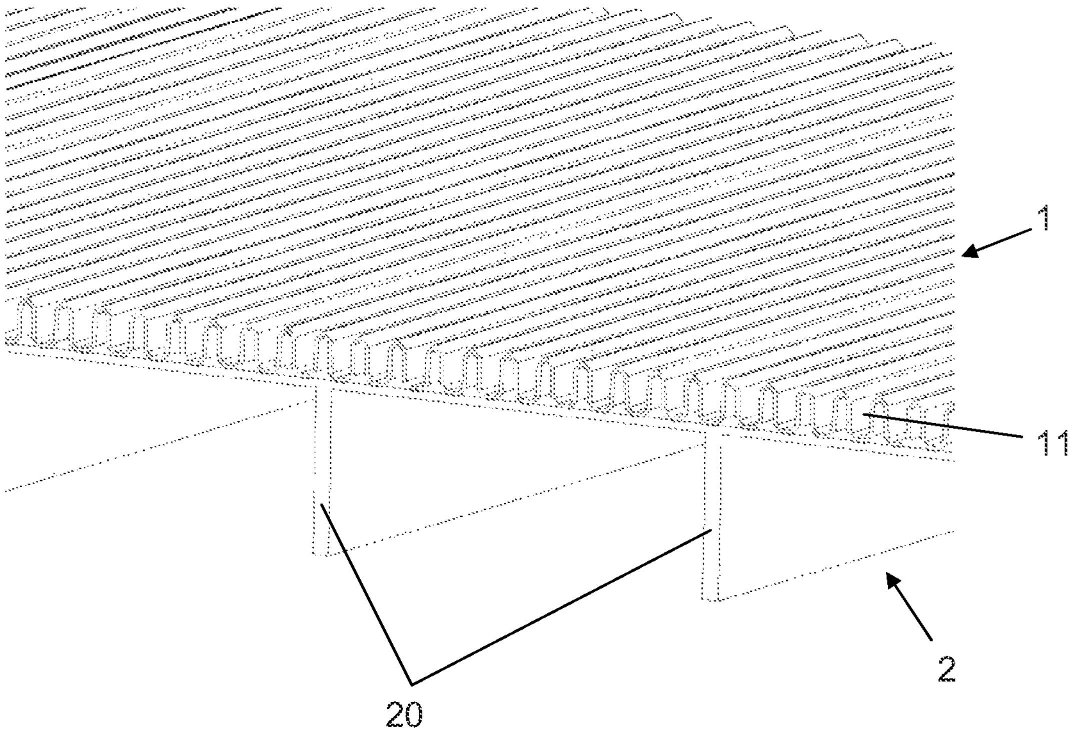
FIG. 3C is a detail of FIG. 3, where the steppable platform uses a composite rack and the steppable grooved surface is formed from a sheet of stainless steel.
Figure 4:
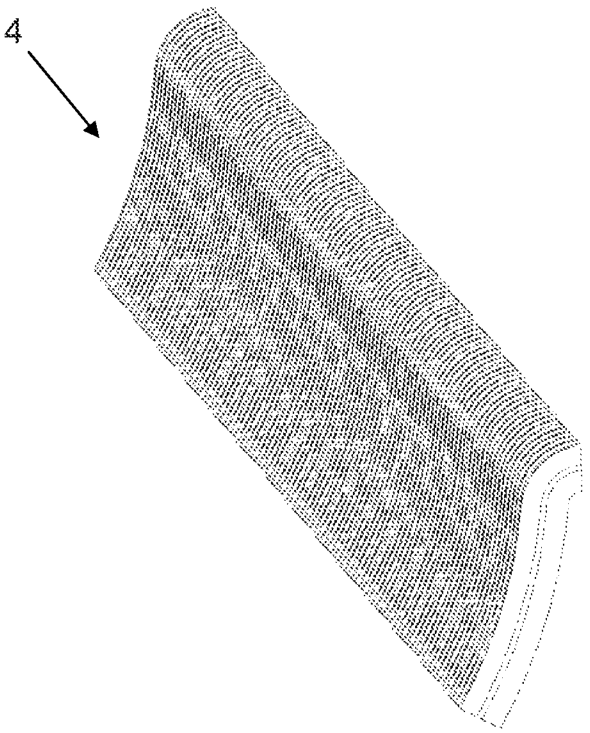
FIG. 4 shows a perspective view of a riser of FIG. 1.
Figure 4A:
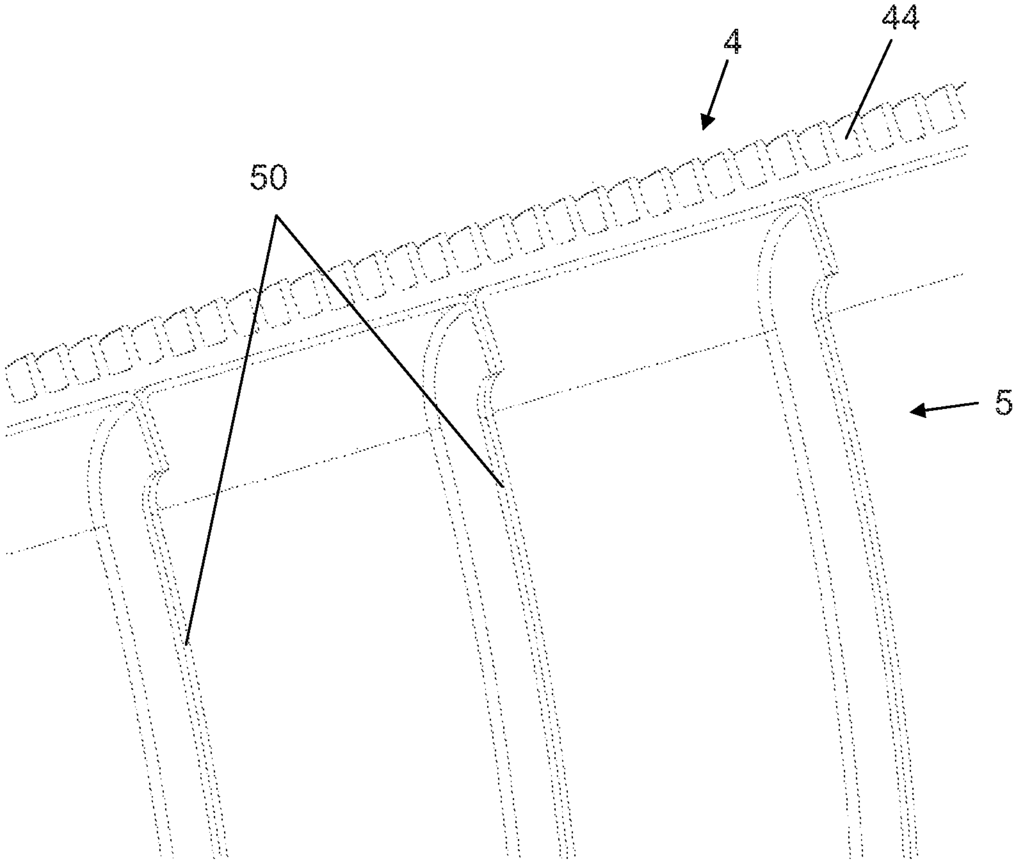
FIG. 4A is a detail of FIG. 4, where the riser is manufactured from a composite having a low coefficient of friction.
Figure 4B:
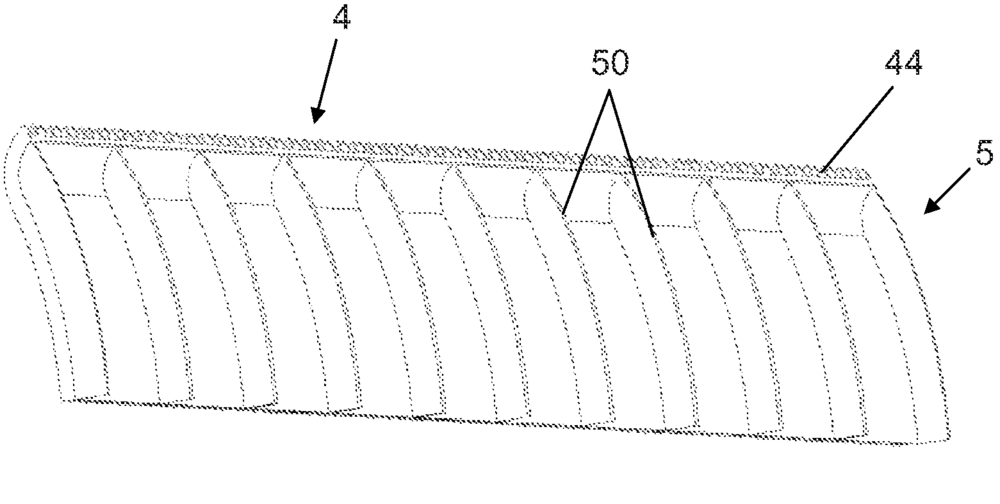
FIG. 4B is a detail of FIG. 4, where the riser is thermoformed from a customized film of resin having a low coefficient of friction reinforced with carbon fibers.
Figure 4C:
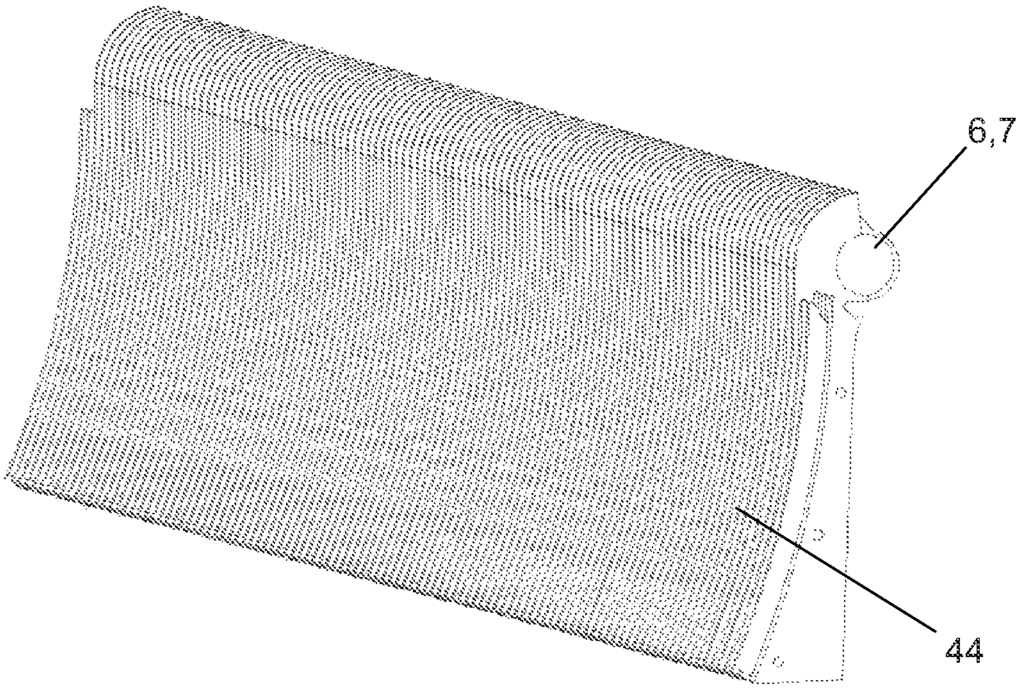
FIG. 4C shows a perspective view of another riser of FIG. 1.
Figure 4D:
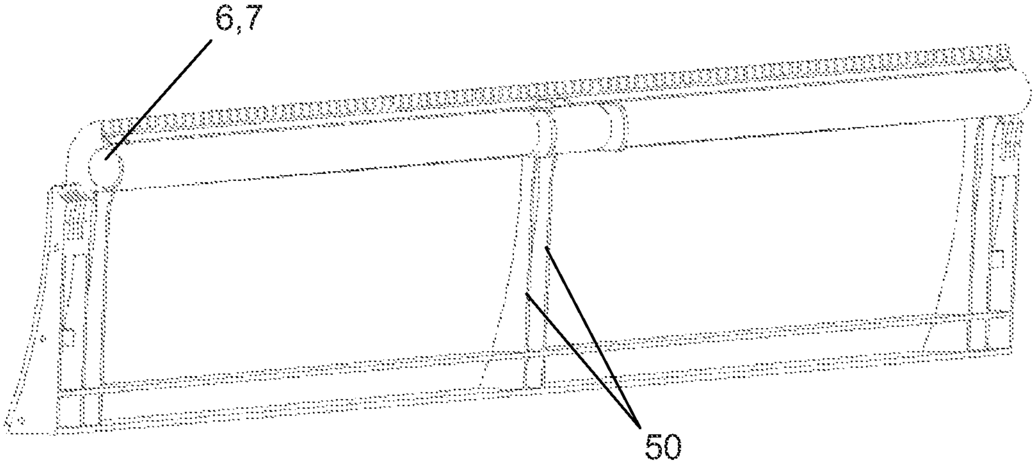
FIG. 4D is a detail of FIG. 4C, where the riser is manufactured from injected aluminum.
Figure 4E:
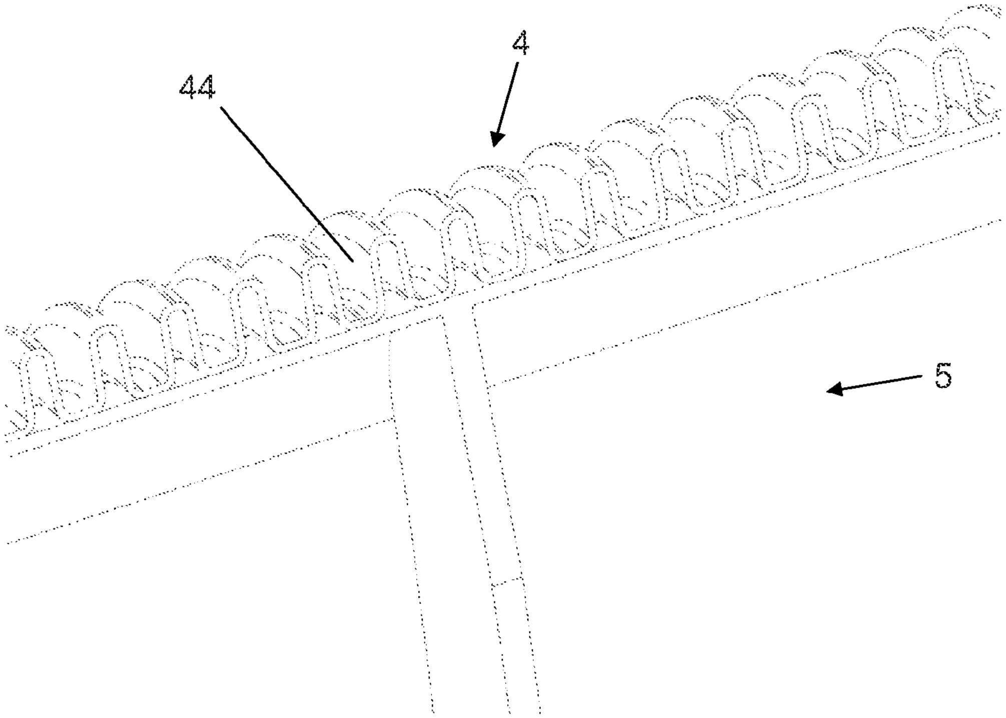
FIG. 4E is a detail of FIG. 4, where the riser uses a composite rack and the grooved surface is formed from a sheet of stainless steel.
Figure 5:
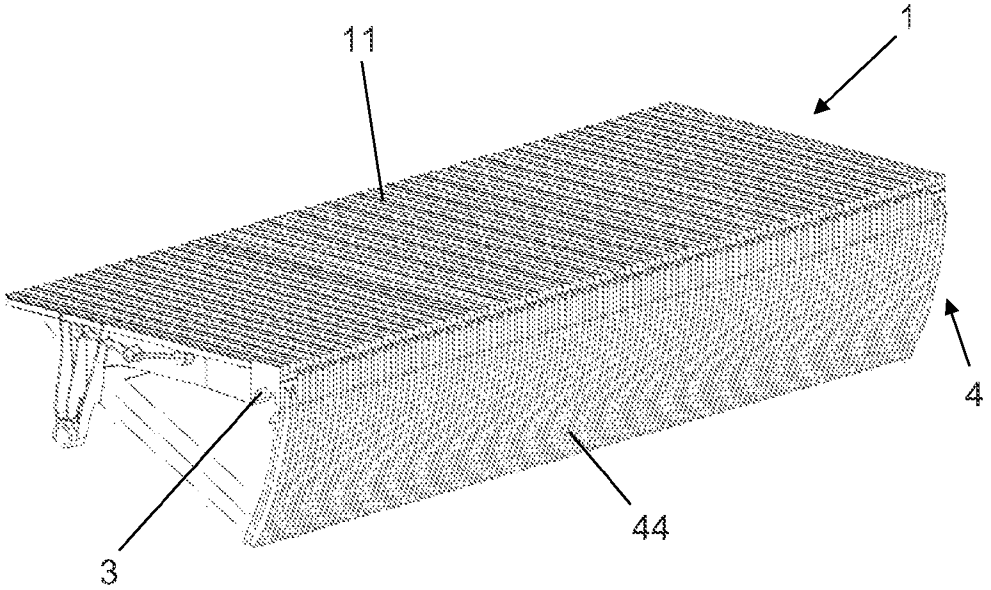
FIG. 5 is a perspective view similar to FIG. 1, showing a convex riser.
Figure 6:
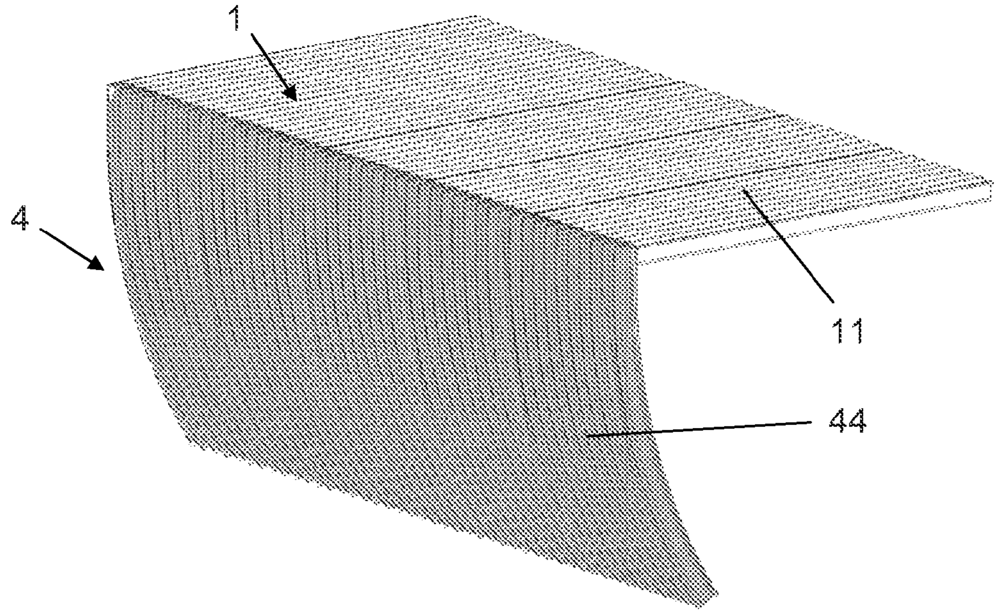
FIG. 6 is a perspective view of the step of the present invention without any articulation, manufactured by means of injection bi-component.
Figure 7:
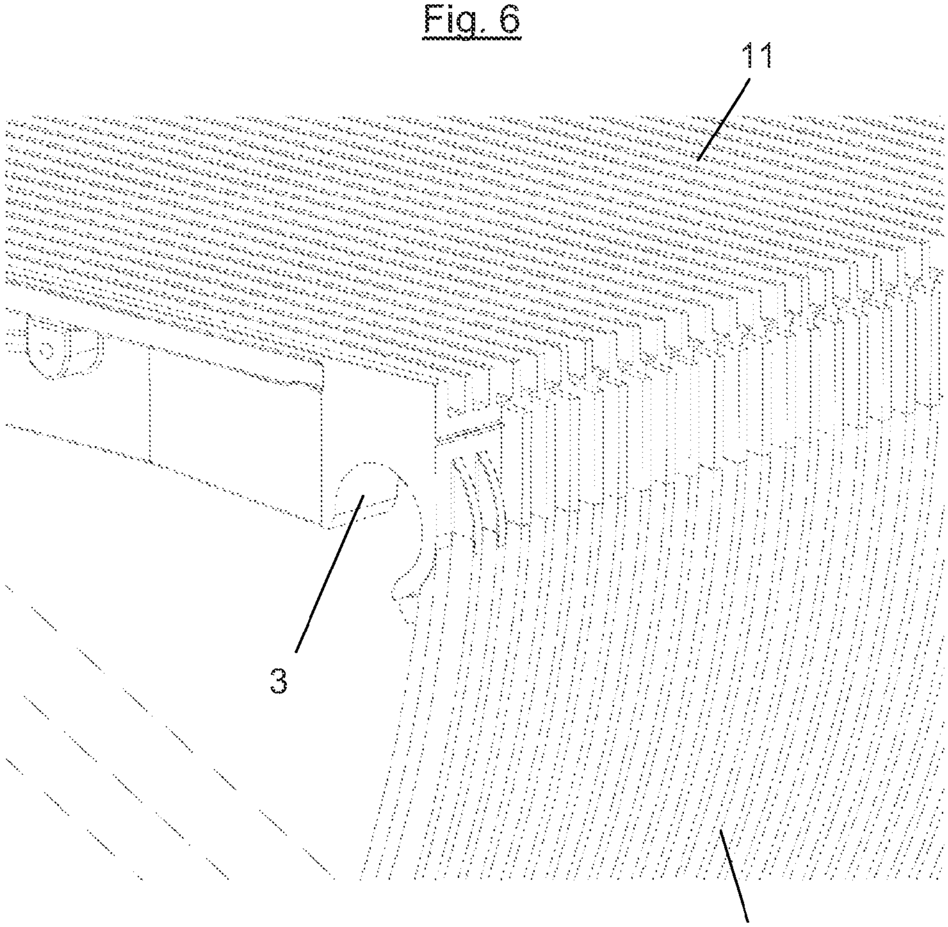
FIG. 7 is a perspective view of the step of the present invention without articulation, manufactured by means of thermoforming a customized film of resin having a high coefficient of friction for the steppable surface and low coefficient of friction for the riser, reinforced with carbon fibers or fibers of another material having high mechanical strength.
Figure 8:
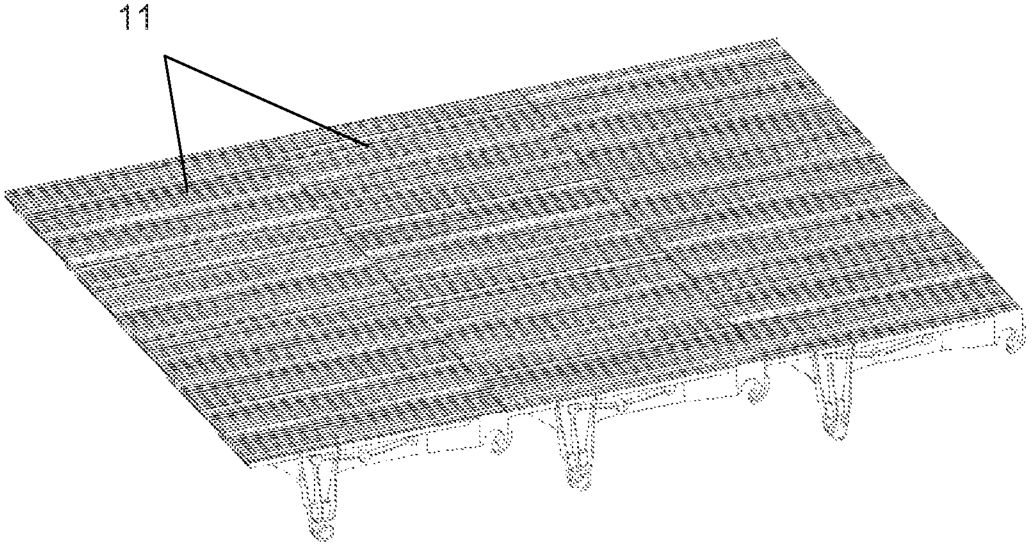
FIG. 8 shows a perspective view of a group of pallets.
Figure 9A:
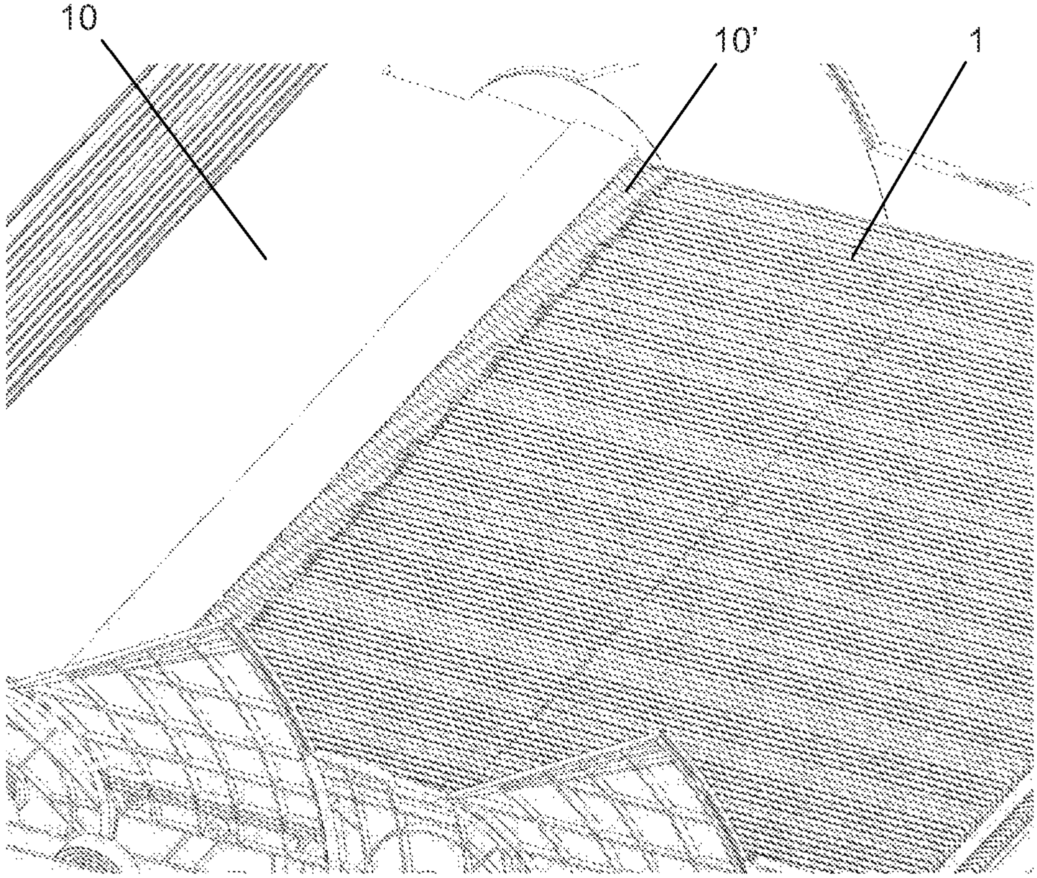
FIGS. 9A, 9B show a fixed plate in a passenger disembarking/boarding area, where the passengers step off/step on the steps/pallets.
Figure 9B:
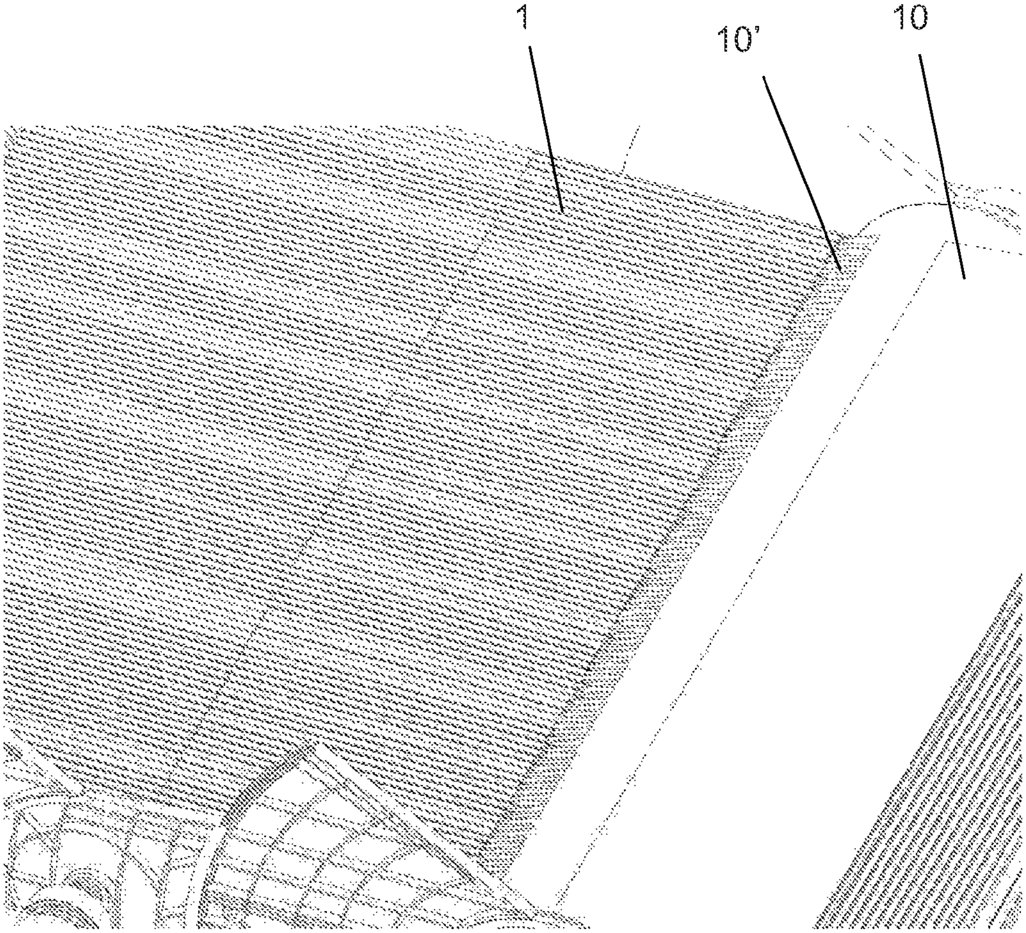
Figure 10A:
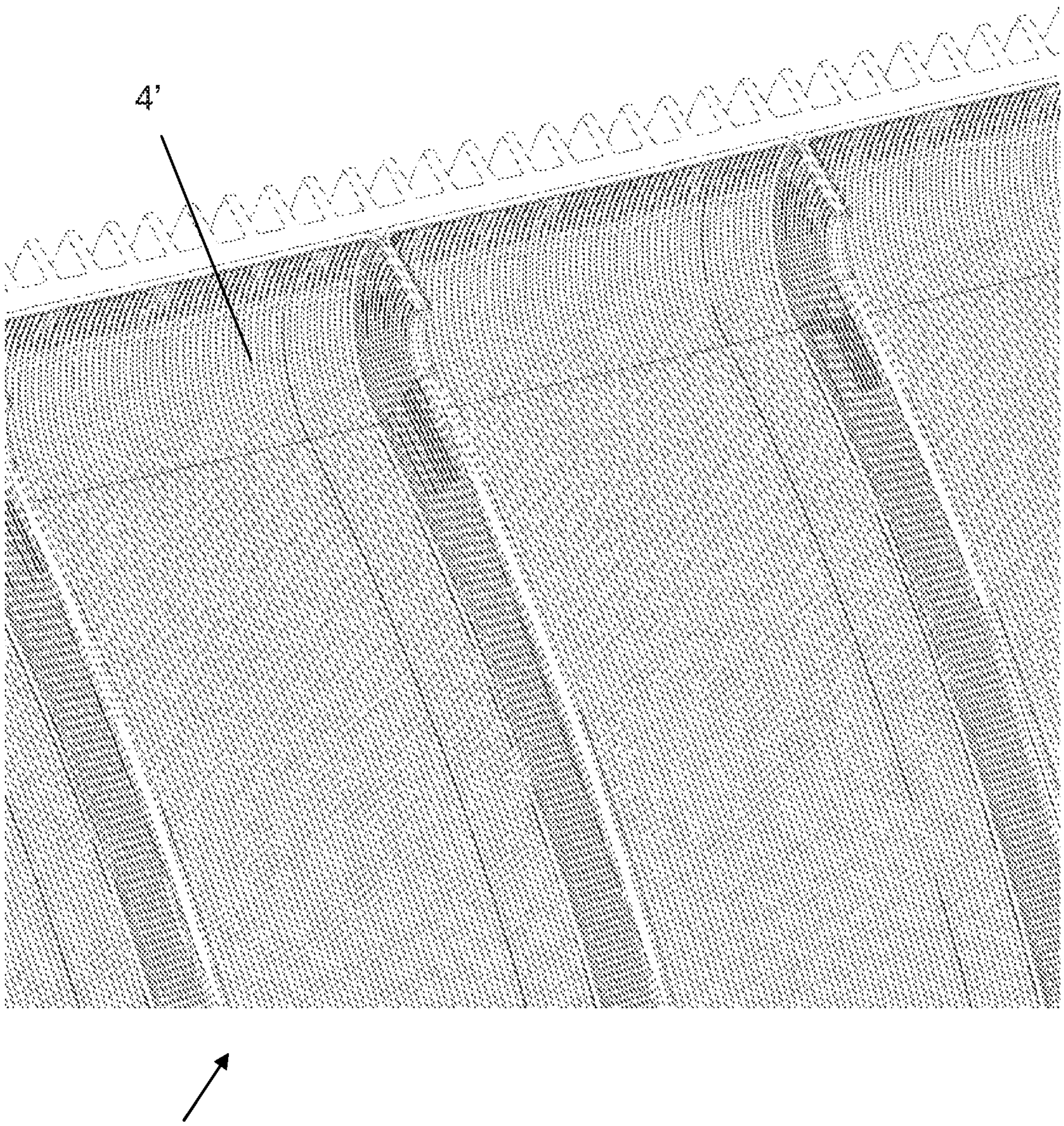
FIGS. 10A, 10B illustrate a tread or first surface and a riser or second surface, where the fibers that can be part of these elements are shown.
Figure 10B:
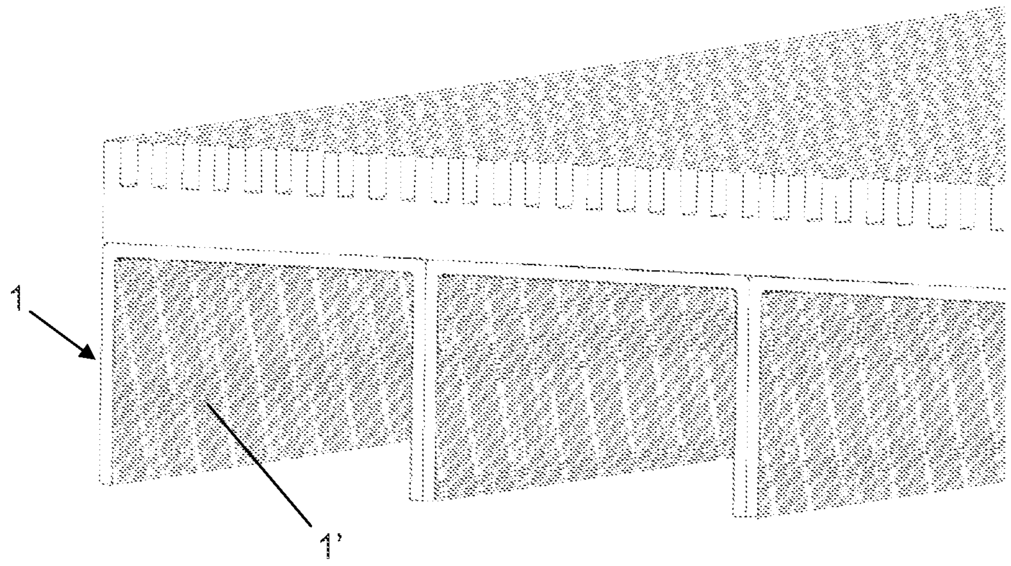

One embodiment of the invention relates to an:

1. Escalator step comprising:

1a) a first surface (1) in a steppable area or tread where the first surface (1) comprises a first material having a first controlled coefficient of friction for increasing passenger stability;

1b) a bearing structure (2) having:

1b1) a support surface configured for supporting the first surface (1);

1b2) a connecting surface configured for housing first connection means (3) configured for being connected to drive means (30);

1c) drive rollers (31) configured for rolling on a first track defining a path to be followed by the step;

1d) support rollers (31') configured for rolling on a second track defining a path to be followed by the step;

1e) a second surface (4) in a riser area comprising a second material having a second controlled coefficient of friction for reducing a risk of being trapped between steps in transitions between the horizontal movement and inclined plane movement areas where there is relative movement between steps;

1f) a frame (5) of the second surface (4) configured for:

1f1) supporting the second surface (4);

1f2) housing attachment means (6) for attachment to the first surface (1);

wherein:

1g) the drive rollers (31) are arranged between the bearing structure (2) and the drive means (30);

1h) the frame (5) houses second connection means (7) configured for being connected to drive means (30).

According to other features of the invention:

2a) The drive rollers (31) are arranged symmetrically with respect to a longitudinal midplane according to a movement direction of the step/pallet.

3a) The drive rollers (31) are separated from one another by a width greater than a width of the bearing structure (2).

4a) The axes of rotation of the drive rollers (31) are contained in a drive plane parallel to the first surface (1).

5a) The drive plane is in a first lower level contained in the connecting surface.

6a) The drive rollers (31) are configured for rotating about a shaft supported by the first connection means (3).

7. The escalator step 7a) comprises a skirting board (32) connected to the step configured for being moved simultaneously with the step.

8a) The skirting board (32) comprises a plurality of plates (32', 32") connected or linked or coupled one after the other for forming a continuous side strip.

9a) A first plate (32') is integral with the first surface (1);

9b) a second plate (32") is integral with second surface (4).

10a) The plates (32', 32") have a front edge and a rear edge where:

10a1) the front edge of a first plate (32') has a shape conjugated with the rear edge of a second plate (32");

10a2) the rear edge of a first plate (32') has a shape conjugated with the front edge of a second plate (32");

10a3) the conjugated shapes of the front and rear edges are configured for allowing relative movement between a first plate (32') and a second plate (32").

11. The conjugated shapes are arc-shaped with the center in the first connection means (3).

12a) The support rollers (31') are arranged between the bearing structure (2) and the drive means (30).

13a) The support rollers (31') are arranged symmetrically with respect to a longitudinal midplane according to a movement direction of the step/pallet.

14a) The support rollers (31') are separated from one another by a width greater than a width of the bearing structure (2).

15a) The axes of rotation of the support rollers (31') are contained in a support plane parallel to the first surface (1).

16a) The support plane is in a second lower level with respect to the connecting surface.

17a) The second lower level is under the first lower level.

18. The escalator step comprises:

18a) a first grooving (11) in the first surface (1) configured for allowing an entrance/exit of the step to/from a fixed plate (10) having a comb (10') in a passenger disembarking/boarding area.

19. The bearing structure (2) comprises structural reinforcements selected from:

19a) a plurality of first longitudinal members (20) parallel to a movement direction of the escalator/moving walkway;

19b) a plurality of first cross pieces (20') perpendicular to a movement direction of the escalator/moving walkway; and 19c) combinations thereof.

20a) The first longitudinal members (20) are metal sections having a U-shaped cross section.

21a) The end branches of the U are positioned perpendicular to the first surface (1);

21b) the central branch of the U is positioned parallel to the first surface (1).

22a) The first longitudinal members (20) are arranged contiguously, the end branches of the U of a first longitudinal member (20) being in contact with the end branches of first longitudinal members (20).

23. The escalator step comprises:

23a) a second grooving (44) in the second surface (4) configured for allowing an entrance/exit of the step in/from another step in transitions between the horizontal movement and inclined plane movement areas where there is relative movement between steps.

24. The frame (5) comprises structural reinforcements selected from:

24a) a plurality of second longitudinal members (50) parallel to a movement direction of the escalator;

24b) a plurality of second cross pieces (50') perpendicular to a movement direction of the escalator; and 24c) combinations thereof.

25a) The second longitudinal members (50) are metal sections having a U-shaped cross section.

26a) The end branches of the U are positioned perpendicular to the second surface (4);

26b) the central branch of the U is positioned parallel to the second surface (4).

27a) The second longitudinal members (50) are arranged contiguously, the end branches of the U of a second longitudinal member (50) being in contact with the end branches of second contiguous longitudinal members (50).

28a) The second surface (4) is arc-shaped with the center in the second connection means (7) of a step selected from a lower step and an upper step.

29. The first surface (1) and the second surface (4) are articulated to one another.

30. The second surface (4) is concave.

31. The first surface (1) and the second surface (4) are integrally attached to one another.

32. The second surface (4) is convex.

33. The skirting board (32) comprises a material selected from plastic and plastic injected on a metal web.

34. The first controlled coefficient of friction has a value comprised between 0.3 and 0.8.

35. The second controlled coefficient of friction has a value comprised between 0.1 and 0.4.

36. A method for manufacturing the step described above is wherein the first surface (1) is obtained by means of a method selected from:

36a) molding a composite material comprising a first resin:

36a1) having a first coefficient of friction comprised between 0.3 and 0.8;

36a2) reinforced with first fibers (1');

36b) injecting under low pressure a first resin having a first coefficient of friction comprised between 0.3 and 0.8 on first dry fibers (1');

36c) vacuum thermoforming a film of a first resin:

36c1) having a first coefficient of friction comprised between 0.3 and 0.8;

36c2) reinforced with first fibers (1').

37. The method comprises:

37a) arranging the first fibers (1') in first directions configured for optimizing a mechanical strength of the first surface (1). The positionings of the first fibers (1') allow obtaining an anisotropic material having optimized mechanical properties for the function to be carried out by the material. The first fibers (1') can thus be positioned:

37a1) in a longitudinal direction to improve the longitudinal bending strength;

37a2) in a transverse direction to improve the transverse bending strength.

38. The first fibers (1') comprise carbon fibers.

39. The first surface (1) is obtained by means of a method selected from:

39a) molding in aluminum casting a first part coated with a coating having a first coefficient of friction comprised between 0.3 and 0.8;

39b) attaching a first grooved part having a first coefficient of friction comprised between 0.3 and 0.8 to a first rack.

40. The second surface (4) is obtained by means of a method selected from:

40a) molding a composite material comprising a resin:

40a1) having a second coefficient of friction comprised between 0.1 and 0.4;

40a2) reinforced with second fibers (2');

40b) injecting under low pressure a resin having a second coefficient of friction comprised between 0.1 and 0.4 on second dry fibers (2');

40c) vacuum thermoforming a film of a resin:

40c1) having a second coefficient of friction comprised between 0.1 and 0.4;

40c2) reinforced with second fibers (2').

41. A method for manufacturing the step described above is wherein it comprises:

41a) arranging the second fibers (2') in directions configured for optimizing a mechanical strength of the second surface (4).

The positionings of the second fibers (2') allow obtaining an anisotropic material having optimized mechanical properties for the function to be carried out by the material. The second fibers (2') can thus be positioned:

41a1) in a longitudinal direction to improve the longitudinal bending strength;

41a2) in a transverse direction to improve the transverse bending strength.

42. The second fibers (2') comprise carbon fibers.

43. The second surface (4) is obtained by means of a method selected from:

43a) molding in aluminum casting a second part coated with a coating having a second coefficient of friction comprised between 0.1 and 0.4;

43b) attaching a second grooved part having a second coefficient of friction comprised between 0.1 and 0.4 to a second rack.

44. The step is obtained by means of a method selected from:

44a) injecting a two-component plastic material having:

44a1) a first material having a first coefficient of friction comprised between 0.3 and 0.8 for forming the first surface (1);

44a2) a second material having a second coefficient of friction comprised between 0.1 and 0.4 for forming the second surface (4);

44c) molding in aluminum casting a part coated with:

44c1) a first coating having a first coefficient of friction comprised between 0.3 and 0.8 for forming the first surface (1);

44c2) a second coating having a second coefficient of friction comprised between 0.1 and 0.4 for forming the second surface (4);

44d) attaching to a rack:

44d1) first grooved parts having a first coefficient of friction comprised between 0.3 and 0.8 for forming the first surface (1);

44d2) second grooved parts having a second coefficient of friction comprised between 0.1 and 0.4 for forming the second surface (4).

The invention claimed is:

1. An escalator step comprising:

a first surface in a steppable area wherein the first surface comprises a first material having a first controlled coefficient of friction for increasing passenger stability;

a bearing structure having:

a support surface configured for supporting the first surface;

a connecting surface configured for housing first connection means configured for being connected to drive means;

drive rollers configured for rolling on a first track defining a path to be followed by the step;

support rollers configured for rolling on a second track defining a path to be followed by the step;

a second surface in a riser area comprising a second material having a second controlled coefficient of friction for reducing a risk of being trapped between steps in transitions between horizontal movement and inclined plane movement areas wherein relative movement is between steps;

a frame of the second surface configured for:

supporting the second surface;

housing attachment means for attachment to the first surface;

wherein:

the drive rollers are arranged between the bearing structure and the drive means;

the frame houses second connection means configured for being connected to the drive means;

the drive rollers are arranged symmetrically with respect to a longitudinal midplane according to a movement direction of the step/pallet;

the drive rollers are separated from one another by a width greater than a width of the bearing structure;

axes of rotation of the drive rollers are contained in a drive plane parallel to the first surface;

the drive plane is in a first lower level contained in the connecting surface;

the drive rollers are configured for rotating about a shaft supported by the first connection means.

2. The escalator step according to claim 1, further comprising a skirting board connected to the step configured for being moved simultaneously with the step;

the skirting board comprises a plurality of plates connected to one another for forming a continuous side strip;

a first plate is integral with the first surface;

a second plate is integral with the second surface;

the plates have a front edge and a rear edge wherein:

the front edge of the first plate has a shape conjugated with the rear edge of the second plate;

the rear edge of the first plate has a shape conjugated with the front edge of the second plate;

the conjugated shapes of the front and rear edges are configured for allowing relative movement between the first plate and the second plate;

the conjugated shapes are arc-shaped with a center in the first connection means.

3. The escalator step according to claim 2, wherein:

the support rollers are arranged between the bearing structure and the drive means;

the support rollers are arranged symmetrically with respect to a longitudinal midplane according to a movement direction of the step;

the support rollers are separated from one another by a width greater than a width of the bearing structure;

axes of rotation of the support rollers are contained in a support plane parallel to the first surface;

the support plane is in a second lower level with respect to the connecting surface;

the second lower level is under the first lower level.

4. The escalator step according to claim 1, further comprising:

a first grooving in the first surface configured for allowing an entrance and exit of the step to and from a fixed plate having a comb in a passenger disembarking and boarding area;

a second grooving in the second surface configured for allowing an entrance and exit of the step in and from another step in transitions between the horizontal movement and inclined plane movement areas wherein relative movement is between steps.

5. The escalator step according to claim 1, wherein the bearing structure comprises structural reinforcements selected from:

a plurality of first longitudinal members parallel to a movement direction of the escalator;

a plurality of first cross pieces perpendicular to a movement direction of the escalator; and combinations thereof;

the frame comprises structural reinforcements selected from:

a plurality of second longitudinal members parallel to a movement direction of the escalator;

a plurality of second cross pieces perpendicular to a movement direction of the escalator; and combinations thereof.

6. The escalator step according to claim 5, wherein:

the first longitudinal members are metal sections having a U-shaped cross section;

the end branches of the U-shaped cross section are positioned perpendicular to the first surface;

the central branch of the U-shaped cross section is positioned parallel to the first surface;

the first longitudinal members are arranged contiguously, the end branches of the U-shaped cross section of a first longitudinal member being in contact with the end branches of first longitudinal members;

the second longitudinal members are metal sections having a U-shaped cross section;

the end branches of the U-shaped cross section are positioned perpendicular to the second surface;

the central branch of the U-shaped cross section is positioned parallel to the second surface;

the second longitudinal members are arranged contiguously, the end branches of the U-shaped cross section of a second longitudinal member being in contact with the end branches of second contiguous longitudinal members.

7. The escalator step according to claim 1, wherein:

the second surface is arc-shaped with a center in the second connection means of a step selected from a lower step and an upper step.

8. The escalator step according to claim 1, wherein the first surface and the second surface are articulated to one another and the second surface is concave.

9. The escalator step according to claim 1, wherein the first surface and the second surface are integrally attached to one another and the second surface is convex.

10. The escalator step according to claim 2, wherein the skirting board comprises a material selected from plastic and plastic injected on a metal web.

11. The escalator step according to claim 1, wherein the first controlled coefficient of friction has a value between 0.3 and 0.8;

the second controlled coefficient of friction has a value between 0.1 and 0.4.

12. A method for manufacturing the escalator step according to claim 1, wherein the first surface is obtained by a method selected from:

molding a composite material comprising a first resin:

having a first coefficient of friction between 0.3 and 0.8;

reinforced with first fibers;

injecting under low pressure a first resin having a first coefficient of friction between 0.3 and 0.8 on first dry fibers;

vacuum thermoforming a film of a first resin:

having a first coefficient of friction between 0.3 and 0.8;

reinforced with first fibers;

wherein the method comprises:

arranging the first fibers in first directions configured for optimizing a mechanical strength of the first surface;

the second surface is obtained by a method selected from:

molding a composite material comprising a resin:

having a second coefficient of friction between 0.1 and 0.4;

reinforced with second fibers;

injecting under low pressure a resin having a second coefficient of friction between 0.1 and 0.4 on second dry fibers;

vacuum thermoforming a film of a resin:

having a second coefficient of friction between 0.1 and 0.4;

reinforced with second fibers;

and wherein the method comprises:

arranging the second fibers in directions configured for optimizing a mechanical strength of the second surface.

13. The method for manufacturing the escalator step according to claim 12, wherein the first fibers comprise carbon fibers; and the second fibers comprise carbon fibers.

14. The method for manufacturing the escalator step according to claim 1, wherein the first surface is obtained by a method selected from:

molding in aluminum casting a first part coated with a coating having a first coefficient of friction between 0.3 and 0.8;

attaching a first grooved part having a first coefficient of friction between 0.3 and 0.8 to a first rack;

the second surface is obtained by a method selected from:

molding in aluminum casting a second part coated with a coating having a second coefficient of friction between 0.1 and 0.4;

attaching a second grooved part having a second coefficient of friction between 0.1 and 0.4 to a second rack.

15. A method for manufacturing the escalator step according to claim 9, wherein the step is obtained by means of a method selected from:

injecting a two-component plastic material having:

a first material having a first coefficient of friction between 0.3 and 0.8 for forming the first surface;

a second material having a second coefficient of friction between 0.1 and 0.4 for forming the second surface;

molding in aluminum casting a part coated with:

a first coating having a first coefficient of friction between 0.3 and 0.8 for forming the first surface;

a second coating having a second coefficient of friction between 0.1 and 0.4 for forming the second surface;

attaching to a rack:

first grooved parts having a first coefficient of friction between 0.3 and 0.8 for forming the first surface;

second grooved parts having a second coefficient of friction between 0.1 and 0.4 for forming the second surface.

* * * * *